2,965,547

PROCESS FOR THE PRODUCTION OF L-6-DIAZO-5-OXONORLEUCINE

John Ehrlich, Grosse Pointe Park, Quentin R. Bartz, Detroit, Henry W. Dion, Royal Oak, and Salvatore A. Fusari, St. Clair Shores, Mich., assignors to Parke, Davis & Company, Detroit, Mich., a corporation of Michigan No Drawing. Filed Jan. 15, 1958, Ser. No. 708,972

10 Claims. (Cl. 195—80)

This application is a continuation-in-part of our co-pending application Serial Number 530,486, filed August 25, 1955, now abandoned, and Serial Number 570,418, filed March 9, 1956, and the invention relates to a process for producing L-6-diazo-5-oxonorleucine.

L-6-diazo-5-oxonorleucine has the structural formula,

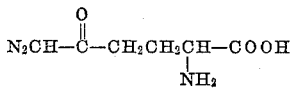

The pure substance has an optical rotation $[\alpha]_D^{26}$ of $+21°$ (5.4% in water). It is relatively unstable to heat and decomposes before melting. Decomposition does not occur at any specific temperature and consequently, the decomposition and melting points vary over a wide range depending upon the method used in their determination. Decomposition usually begins at about 145° C. and may continue until 155° C. is reached. Decomposition is accompanied by gas evolution. The compound decomposes in aqueous acid with the liberation of nitrogen. Hydrogen binding curves show values for $pK\alpha$ in water of 2.1 and 8.95.

The ultraviolet absorption spectra of L-6-diazo-5-oxonorleucine show characteristic ultraviolet absorption maxima of $$E_{1\,cm.}^{1\%} \text{ of } 683 \text{ at } 274 \text{ millimicrons}$$

and of 376 at 244 millimicrons in aqueous phosphate buffer at pH 7.

In accordance with the invention a process is provided for producing L-6-diazo-5-oxonorleucine by microbiological means which involves cultivating a microorganism herein designated as Streptomyces C-2943 under artificial conditions in a suitable nutrient medium followed by isolation of the product from the culture medium.

Streptomyces C-2943 is a hitherto unknown microorganism which occurs in soils. It was first isolated from a soil sample collected at Chincha, Peru. Cultures of the living organism have been added to the permanent collections of the Culture Bureau of Parke, Davis & Company, Detroit 32, Michigan, under No. 04997 and to the culture collections of the Fermentation Division, Northern Utilization Research Branch, U.S. Department of Agriculture, Peoria, Illinois, under NRRL No. 2552.

Cultures of this microorganism can be obtained by preparing a suspension in sterile water of a soil sample containing it, allowing the heavier particles to settle, plating out the resultant supernatant soil suspension in serial dilutions on nutrinet agar plates, incubating the plates at 24 to 28° C. to provide microorganism growths and transplanting selected individual growths resembling Streptomyces C-2943 to fresh nutrient agar plates. By repeatedly selecting and transplanting uncontaminated, characteristic growths to fresh nutrient agar plates, thalli constituting pure cultures of the desired microorganism are obtained.

Streptomyces C-2943 is an aerobic and aerially sporulating member of the order Actinomycetales and belongs to the genus Streptomyces as described in the Sixth Edition of Bergey's Manual of Determinative Bacteriology. The organism has the following characteristics: when cultured on glucose-tryptone or nutrient agar media, the primary substratal mycelium is gray to black; on asparagine-glycerol or glucose-synthetic agar media, the mycelium is white or light gray to light purple or light red to gray; and on Czapek's or calcium-malate agar media, white to light yellow to gray. On these media, the aerial mycelium is at first white, later turning to gray. When the organism is cultivated in glucose-tryptone or nutrient agar media a dark brown or black coloration appears in the substrate but when cultured in glycerol-asparagine, Czapek's or calcium-malate agar media the color of the medium remains essentially unchanged. Microscopically, the aerial hyphae are long, ranging from approximately 100 to 500 microns in length. Primary and sometimes secondary branching occurs. Terminal loops and spirals occur. The spirals vary in length and consist of 2 to 15 turns. The coils are often loose and irregular. Distal portions of these aerial hyphae subdivide into spore chains.

The organism liquifies gelatin slowly, forming a dark brown color in the medium, and usually does not peptonize litmus milk. In synthetic medium [Pridham et al., J. Bacteriology, 56, 108 (1948)], the organism utilizes numerous carbon sources including L-arabinose, cellobiose, dextrin, glucose, D-galactose, glycerol, i-inositol, inulin, lactose, levulose, maltose, D-mannitol, D-mannose, melibiose, raffinose, rhamnose, starch, sucrose, trehalose and D-xylose; less readily adonitol, aesculin and salicin; and does not utilize dulcitol, melezitose, and D-sorbitol. The organism utilizes inorganic and organic nitrogen sources.

The production of L-6-diazo-5-oxonorleucine utilizing Streptomyces C-2943 is carried out by inoculating a suitable sterile aqueous nutrient medium with Streptomyces C-2943, incubating the resulting mixture under sterile aerobic conditions at a temperature between about 20–35° C., removing the solid material present in the culture mixture and isolating the desired L-6-diazo-5-oxonorleucine from the aqueous culture liquid.

For the inoculation, spores or conidia of Streptomyces C-2943 as well as aqueous suspensions of the same containing a small amount of soap or other wetting agent can be used. For large fermentations it is preferable to use vigorous, young cultures of Streptomyces C-2943, rather than the spores or conidia or aqueous suspensions of the same.

Suitable aqueous nutrient media are those having a pH between 5.0 and 8.5 and containing carbon and nitrogen sources as well as inorganic salts. Suitable sources of carbon and nitrogen include inter alia soybean oil meal, wheat gluten meal, brewer's yeast, hog stomach (saline extracted), meat protein hydrolysate, distillers solubles and corn steep solids. Several combinations of these carbon and nitrogen sources with other nitrogenous materials, such as a mixture of soybean oil meal, acid hydrolyzed casein and debittered yeast, a mixture of saline extracted hog stomach and soybean peptone and a mixture of soybean oil meal and acid hydrolyzed casein have also been found to produce particularly good results. The optimum concentration of these ingredients ranges from 1.5 to 2% of the total weight of the medium. The carbon source can be composed solely of the aforementioned materials, but best results are obtained when glucose or galactose is added to the medium. The concentration of glucose or galactose can vary from 0 to 2%. Concentrations above 2% appear to have a deleterious effect on the yield of the desired product. As inorganic salts, sodium chloride, ammonium chloride, ammonium nitrate, potassium chloride, calcium carbonate and the like can be used. Ammonium salts such as ammonium chloride and ammonium nitrate are particularly desirable constituents and lead to high yields of the desired product. The optimum concentration of these ammonium salts is between 0.1 to 0.5% of the nutrient medium.

The cultivation of Streptomyces C–2943 in aqueous nutrient medium can be carried out in a number of different ways. For example, microorganisms can be cultivated under aerobic conditions on the surface of this medium or they can be cultivated beneath the surface of the medium, that is, in submerged condition if oxygen is simultaneously supplied.

The preferred method for producing L-6-diazo-5-oxonorleucine by fermentation on a large scale involves the use of submerged or deep cultures of Streptomyces C–2943. According to this embodiment of the fermentation, a sterile aqueous nutrient medium is inoculated with Streptomyces C–2943 and incubated with agitation and aeration at a temperature between about 20–35° C., preferably in the neighborhood of 23–29° C., until a maximum concentration of L-6-diazo-5-oxonorleucine has been produced in the culture liquid. The length of time required for the maximum production of L-6-diazo-5-oxonorleucine varies with the size and type of equipment used. For example, in large-scale commercial fermentations, such as carried out in the tank-type fermentors, maximum production of L-6-diazo-5-oxonorleucine is reached in about thirty-two hours or less. When shaker flasks are used for the cultivation, the time of the maximum production may take longer, ranging from three to eight days, than that required for the large-scale fermentation vats. Under submerged culture conditions, the microorganism develops as more or less discrete particles dispersed throughout the nutrient medium in contrast with the more or less continuous pellicle present on the surface of the medium in the surface culture method. By virtue of this distribution of the organism throughout the media, large volumes of the inoculated nutrient medium can be cultivated at one time in the large tanks and vats customarily employed in the fermentation industry. Stationary vat fermentors equipped with suitable agitation and/or aeration devices, as well as horizontal drum fermentors, have been found to be particularly useful in this respect. However, for the preparation of smaller quantities of the antibiotic or of cultures of the microorganism, the submerged culture method may be carried out in small flasks or jars which may be either shaken or stirred by suitable mechanical means.

Agitation and aeration of the culture may be accomplished in a number of ways. Agitation may be provided by turbines, paddles, impellers or other mechanical agitation devices, by revolving or shaking the fermentor itself, by various pumping devices or by the passage of air or other oxygen-containing gases through the medium. Aeration may be effected by injecting air or other oxygen-containing gases into the fermentation mixture through open pipes, perforated pipes, porous diffusion media, such as carbon sticks, Carborundrum, sintered glass and the like or it may be provided by spraying, splashing or spilling the mash into or through an oxygen-containing atmosphere.

The surface culture method of producing L-6-diazo-5-oxonorleucine involves inoculating a shallow layer usually less than 2 cm. of a sterile, aqueous nutrient medium with Streptomyces C–2943 and incubating the mixture under aerobic conditions at a temperature between about 20–35° C., preferably in the neighborhood of 23–29° C. A longer incubation period than that employed in the deep culture method is usually necessary to obtain the maximum production of L-6-diazo-5-oxonorleucine. In general, the incubation period is in the neighborhood of three to eight days.

After completion of the fermentation phase of the process, the solid material is removed from the culture liquid, for example, by filtration, centrifugation, etc. and the L-6-diazo-5-oxonorleucine contained in the resulting liquid isolated in concentrated or crystalline form. A convenient method of isolating the product involves concentrating the clarified culture liquid to a small volume, for example one-fifth to one-twentieth of the original volume, adding about three to ten volumes of a water-miscible organic solvent such as methanol or ethanol, separating the precipitated impurities from the solution, subjecting the purified solution to adsorption and elution with an adsorbent for L-6-diazo-5-oxonorleucine and recovering the product from the eluate. Another convenient method involves concentrating the clarified culture liquid to dryness, extracting the residual product with a water-miscible organic solvent containing less than 50% water, subjecting the extract to adsorption and elution with an adsorbent for L-6-diazo-5-oxonorleucine and recovering the product from the eluate. Adsorption is accomplished by passing the purified solution or extract referred to, through an adsorption column containing a neutral adsorbent having a pH or adjusted pH between about 5 to 8 and preferably 6 to 8. Some examples of suitable adsorbents are alumina or Brockmann's alumina. The product is eluted from the adsorbent with water or an aqueous solution of a water-miscible organic solvent. The eluate is collected in fractions and the fractions showing the strongest ultraviolet absorption at a wave-length of about 275 millimicrons are dried. Due to the unstable nature of the product at elevated temperature, it is preferable to remove the eluant by freezing the eluate and subjecting the frozen mass to high vacuum. The product can be further purified by adsorption and elution employing activated carbon. For this purpose, the dry product prepared as described above, is dissolved in a small amount of water containing a minor proportion of a water-miscible organic solvent, the pH of the solution is adjusted to 6 to 7 if necessary, the solution is passed through an adsorption column containing activated carbon and the column is eluted with water containing a minor proportion of a water-miscible organic solvent, preferably acetone. In providing the solution for the adsorption step, water containing a minor proportion of an organic solvent such as acetone, methanol, ethanol, phenol and the like, will be satisfactory. Preferably, water containing about 1% acetone is employed and sufficient solvent is used to give a solution containing about 2 to 10 mg. of L-6-diazo-5-oxonorleucine per milliliter. The amount of activated carbon required to adsorb all of the desired product from the solution varies with the concentration of L-6-diazo-5-oxonorleucine in the dry product. For example, material assaying 5% of L-6-diazo-5-oxonorleucine ordinarily requires about fifteen grams of activated carbon per gram. Best results are obtained when the activated carbon is preliminarily slurried with diatomaceous earth by reason of the fact that the latter aids in maintaining a satisfactory flow rate. Following the adsorption step, the column is eluted by washing with a suitable eluant such as water containing less than 25% of a water-miscible organic solvent. For best results, a 1% solution of acetone in water is employed. The eluate is collected in fractions and the fractions showing the strongest ultraviolet absorption at a wave-length of about 275 millimicrons are dried from the frozen state. If desired, the dry product so obtained can be further processed by recrystallization from a suitable solvent such as aqueous methanol, ethanol and the like.

The L-6-diazo-5-oxonorleucine produced by the process of the invention possesses pronounced phytotoxic properties and is particularly useful as a herbicide, deweeding agent and the like. For this purpose, a dilute aqueous solution is employed and the solution applied to the plant or plant crop in accordance with methods which are known in the art. The product is effective in high dilution and in addition has a selective action against certain undesirable weed species. For example, an aqueous solution at a concentration of 1000 parts per million applied in a spray to the point of drip off to separate vigorously growing test plots of lamb's-quarters and pigweed gives 100% kills whereas the growth of a comparable plot of corn is inhibited to the extent of only 20% under identical conditions.

The invention is illustrated by the following examples.

*Example 1*

300 milliliters of a nutrient medium having the following composition:

| | Percent |
|---|---|
| Maltose | 1.0 |
| Butanol-acetone fermentation residue | 0.5 |
| Acid hydrolyzed casein | 0.5 |
| Calcium carbonate | 0.1 |
| Sodium chloride | 0.5 |
| Water sufficient to make 100.0 percent | | is placed in each of two one-liter Erlenmeyer flasks and the pH adjusted to 7.5 with 6 normal sodium hydroxide solution. The nutrient medium is then sterilized by heating the flasks at 120° C. for twenty-five minutes. The medium is cooled and each of the flasks inoculated with 2 ml. of a suspension, in 40 ml. of sterile 0.01% castile soap solution, of spores from four agar (glucose-tryptone-mineral salts) slant cultures of Streptomyces C–2943. The flasks are maintained at room temperature (24–26° C.) for ninety hours with agitation supplied by mechanical shakers which rotate the flasks at 160 r.p.m. in a 2⅜-inch diameter circle. The culture liquid contains approximately one mg. of L-6-diazo-5-oxonorleucine, as determined by disk-plate agar diffusion tests involving the measurement of the extent of inhibition of the growth of the yeast *Torulopsis albida* NRRL Y1400. The culture liquid is filtered and the desired product, L-6-diazo-5-oxonorleucine, is isolated from the filtrate by adsorption and elution methods described in detail in Examples 2 and 3.

*Example 2*

Twelve liters of a medium having the following composition:

| | Percent |
|---|---|
| Glucose monohydrate | 2.0 |
| Soybean oil meal | 1.0 |
| Hog stomach saline extracted | 0.5 |
| Ammonium chloride | 0.167 |
| Sodium chloride | 0.5 |
| Calcium carbonate | 0.5 |
| Water sufficient to make 100.0 percent | |
| Sodium hydroxide (10 N) sufficient to bring the pH to 7.5 | | are placed in a 30-liter glass fermentor equipped with stainless steel fittings including sparger, impeller, baffles and sampling line and the medium sterilized by heating at 121° C. for two hours. The post-sterilization pH of the medium is 7.8. The medium is cooled and inoculated with a suspension, in 10 ml. of sterile 0.1% sodium heptadecyl sulfate solution, of spores from an agar (glucose-tryptone-mineral salts) slant culture of Streptomyces C–2943. The inoculated medium is incubated at 25–26° C. for seventy-two hours during which time the medium is stirred at 225 r.p.m. and sterile air is passed into the medium at the rate of 12 liters per minute. During incubation, 98 ml. of a sterilized mixture of crude lard and mineral oils containing mono- and diglycerides are added as needed to control foaming. The incubated culture thus obtained is used to inoculate the main cultures as described below.

Four 30-liter glass fermentors, each containing 16 liters of the medium described above are sterilized at 121° C. for two hours, the post-sterilization pH being 7.6. The fermentors containing the sterile medium are allowed to cool to room temperature, 800-ml. aliquots from the incubated culture described above are placed in each fermentor, and the inoculated media are incubated at 25–26° C. for forty hours. Throughout the incubation period air is supplied through a sparger at the rate of 16 liters per minute and agitation is provided by an impeller operating at 200 r.p.m. During incubation, 30 ml. of a sterilized mixture of lard and mineral oils described above are added to each fermentor as needed to control foaming. The concentration of L-6-diazo-5-oxonorleucine in the fermentation media following incubation is approximately 37 micrograms per milliliter.

The solid material present in the incubated fermentation media is removed by slurrying with 1% of diatomaceous earth and filtering. The filtrate possesses biological activity as shown by the fact that daily intraperitoneal injection of 0.1 ml. for five days grossly inhibits the growth of implanted Sarcoma 180 tumors in mice.

The filter cake is washed with water and the filtrate and washings are combined (41.5 liters) and concentrated in vacuo to a volume of 1920 ml. Ethanol is added to the concentrate to bring the volume to 19.2 liters, the precipitate which forms is removed by filtration and the filter cake washed with ethanol. The alcoholic filtrate (pH 6.5) is passed through an adsorption column prepared as described below.

2.3 kilograms of alumina are stirred with dilute hydrochloric acid so that the pH remains constant at 6.4. The alumina is removed, washed with water and activated by heating at 200° C. for four hours. The alumina is stirred with 90% aqueous ethanol and packed into a column having a diameter of 10 cm. (hold-up volume, 2300 ml.; gravity flow rate, 5 liters per hour).

The alcoholic filtrate prepared above is passed into the adsorption column and the column is washed successively with 1.9 liters of 90% aqueous ethanol and 12.1 liters of 75% aqueous ethanol. The percolate is discarded. The column is then eluted with 18 liters of 25% aqueous ethanol and the eluate collected in one-liter fractions. The first five fractions of eluate are concentrated in vacuo and the concentrate dried from the frozen state under high vacuum. The dried product possesses the desired L-6-diazo-5-oxonorleucine as shown by the fact that intraperitoneal injection twice daily for five days of 0.5 ml. of an aqueous solution of the product (300 gamma per milliliter) grossly inhibits the growth of implanted Sarcoma 180 tumors in mice.

8.5 grams of the dried material assaying approximately 4 percent L-6-diazo-5-oxonorleucine is dissolved in 150 ml. of one percent acetone in water (pH 6.2). An adsorption column is prepared by adding a slurry of 125 g. of activated carbon and 125 g. of diatomaceous earth in a solution of one percent acetone in water, to a column having a diameter of 6.5 cm. (hold-up volume, 800 ml.; gravity flow rate, 750 ml. per hour). The aqueous solution containing L-6-diazo-5-oxonorleucine is passed through the column and the column is washed with 4.0 liters of one percent acetone solution. The eluate is collected in 100 ml. fractions. The fifteenth to twenty-third fractions inclusive are concentrated and the concentrate dried from the frozen state under high vacuum. The dried material is dissolved in warm 90 percent aqueous methanol and the solution is stored at 5° C. for several hours. The L-6-diazo-5-oxonorleucine which separates in crystalline form is collected and dried under vacuum;

$$E_{1\ cm.}^{1\%} = 643 \text{ at } 274.5 \text{ millimicrons}$$

The chemical, biological and other physical properties of the product are the same as those described in the foregoing description.

Example 3

150 milliliters of a nutrient medium having the following composition:

| | Percent |
|---|---|
| Glucose monohydrate | 2.0 |
| Soybean oil meal | 1.0 |
| Hog stomach saline extracted | 0.5 |
| Ammonium chloride | 0.167 |
| Sodium chloride | 0.5 |
| Calcium carbonate | 0.5 |

Water sufficient to make 100.0 percent
Sodium hydroxide (10 N) sufficient to bring the pH to 7.5 is placed in a one-liter Erlenmeyer flask. The nutrient medium is then sterilized by heating the flask at 121° C. for one-half hour, cooled, and the flask is inoculated with 5 ml. of a suspension, in 10 ml. of sterile 0.1% sodium heptadecyl sulfate solution, of spores from an agar (glucose-tryptone-mineral salts) slant culture of Streptomyces C–2943. The flask is incubated at 26° C. for seventy-two hours with agitation supplied by a mechanical shaker which rotates the flask at 160 r.p.m. in a 2⅜-inch diameter circle. The incubated culture thus obtained is used to inoculate the 15-gallon medium described below.

Fifteen gallons of nutrient medium having the composition described above is placed in a 30-gallon stainless steel fermentor and the medium sterilized by heating at 121° C. for one hour. The post-sterilization pH of the medium is 6.9. The medium is cooled and inoculated with 90 ml. of the incubated culture described above. The inoculated medium is incubated at 26° C. for twenty-four hours. During the incubation period sterile air is supplied to the medium through a sparger at the rate of 3.4 cubic feet per minute. The incubated culture of Streptomyces C–2943 thus obtained is used to inoculate the 150-gallon medium described below.

One hundred and fifty gallons of nutrient medium having the composition described above is placed in a 200-gallon stainless steel fermentor and is sterilized by heating at 121° C. for one hour. The post-sterilization pH of the medium is 6.7. The medium is cooled and inoculated with fifteen gallons of the incubated culture described in Example 3 above. The culture mixture is incubated at 27° C. for twenty-seven hours during which time sterile air is supplied to the mixture through a sparger at the rate of 25 cubic feet per minute and the mixture is agitated with an impeller at 200 r.p.m. In order to control foaming, 2.4 liters of a sterile mixture of crude lard and mineral oils containing mono- and diglycerides are added from time to time as required.

The solid material present in the incubated mixture is removed by filtration through a plate-and-frame filter press precoated with diatomaceous earth and the filtrate is concentrated under reduced pressure to a volume of approximately eight gallons. The concentrate is mixed with seventy-two gallons of ethanol and the precipitate which forms is removed by filtration and discarded.

A portion (47.5 gallons) of the ethanol filtrate (total volume, 76.5 gallons; pH, 5.9) is passed through an adsorption column prepared in the following manner: Fifty pounds of alumina are stirred with dilute hydrochloric acid so that the pH remains constant at 6.0. The alumina is filtered, washed with deionized water, and activated by heating at 200° C. for four hours. The alumina is stirred with 90% aqueous ethanol and packed into a 6 foot column having a diameter of six inches (hold-up volume, 4.7 gallons; flow rate, 9 gallons per hour under a pressure head of 12 pounds per square inch).

The alcoholic filtrate prepared above is percolated through the adsorption column under a positive pressure of 12 pounds per square inch and the column is washed successively with 4.7 gallons of 90 percent aqueous ethanol and 31.7 gallons of 75 percent aqueous ethanol. The column is then eluted with 28.5 gallons of 25 percent aqueous ethanol and the eluate collected in 2.4 gallon fractions. The fourth, fifth, and sixth fractions are combined, concentrated in vacuo at 35° C. and the concentrate dried from the frozen state under high vacuum to obtain a dry powder.

The remaining 29 gallon portion of the ethanol filtrate is chromatographed on 27 pounds of alumina according to the method described above and the eluate is concentrated and dried from the frozen state to obtain a dry powder.

The two dry powders prepared as described above from the ethanol filtrate are combined. The product so obtained contains 2.16 grams of L-6-diazo-5-oxonorleucine. The product is purified by adsorption and elution in the following manner: a slurry of 780 grams of activated charcoal and 780 grams of diatomaceous earth in a one percent solution of acetone in water is added to a five foot column having a diameter of four inches. The settled adsorbent bed is 22″ high, has a hold-up volume of 4 liters, and a gravity flow rate of 1.75 liters per hour with a 38″ head. The product is dissolved in 858 ml. of 1 percent acetone in water and the solution percolated through the column. The column is eluted with 20 liters of a 1 percent solution of acetone in water. Fractions of 500 ml. each are collected. The seventeenth to twentieth fractions inclusive are combined and concentrated in vacuo; the concentrate is frozen, and the ice sublimed therefrom under high vacuum. The product, L-6-diazo-5-oxonorleucine, is recrystallized from 90 percent aqueous methanol;

$E_{1cm}^{1\%} = 676$ at 274 millimicrons

The crystalline product possesses biological activity as shown by the fact that daily intraperitoneal injection of an aqueous solution of the product (0.25 mg./kg.) for five days grossly inhibits the growth of implanted Sarcoma 180 tumors in mice. The chemical, and other biological and physical properties of the product are the same as those described in the foregoing description.

While in the foregoing description we have set forth in detail certain embodiments of the present invention, it will be understood by those skilled in the art that considerable variation may be made in such detail without departing from the spirit of our invention.

We claim:
1. Process for the production of L-6-diazo-5-oxonorleucine which comprises inoculating with Streptomyces C–2943 a sterile aqueous nutrient medium having a pH between 5.0 and 8.5 and containing suitable sources of carbon, nitrogen and mineral salts, incubating the resulting mixture under aerobic conditions at a temperature between about 20 to 35° C. for a length of time sufficient for the production of L-6-diazo-5-oxonorleucine and removing the solid material present in the culture mixture.

2. Process for the production of L-6-diazo-5-oxonorleucine which comprises inoculating with Streptomyces C–2943 a sterile aqueous nutrient medium having a pH between 5.0 and 8.5 and containing suitable sources of carbon, nitrogen and mineral salts, incubating the resulting mixture under aerobic conditions at a temperature between about 20 to 35° C. for a length of time sufficient for the production of L-6-diazo-5-oxonorleucine, removing the solid material present in the culture mixture and isolating L-6-diazo-5-oxonorleucine from the aqueous culture liquid.

3. Process according to claim 2 wherein the inoculated medium is incubated under submerged aerobic conditions at a temperature between 23 and 29° C.

4. Process according to claim 2 wherein the nutrient medium contains at least one of the following nutrient materials in total quantity between 1.5 to 2%: soybean oil meal, wheat gluten meal, brewer's yeast, saline extracted hog somach, meat protein hydrolysate, distillers solubles, corn steep liquors, soybean peptone and hydrolyzed casein.

5. Process according to claim 2 wherein the nutrient medium contains less than 2% of a member of the group consisting of glucose and galactose, between 0.1 to 0.5% of an inorganic ammonium salt.

6. Process according to claim 2 wherein the isolation step comprises concentrating the culture liquid, adding a water-miscible organic solvent to the concentrated liquid, separating precipitated impurities, and subjecting the residual solution to adsorption and elution with an adsorbent for L-6-diazo-5-oxonorleucine.

7. Process according to claim 2 wherein the isolation step comprises concentrating the culture liquid to one-fifth to one-twentieth of original volume, adding about three to ten volumes of a water-miscible organic solvent, separating precipitated impurities, contacting the residual solution with alumina having a pH between 5 to 8 thereby causing adsorption of L-6-diazo-5-oxonorleucine, eluting the adsorbed L-6-diazo-5-oxonorleucine with an eluant of the group consisting of water and aqueous solutions of water-miscible organic solvents and removing the eluant from the fractional portion of the eluate containing L-6-diazo-5-oxonorleucine.

8. Process according to claim 7 wherein the eluate is aqueous ethanol.

9. Process according to claim 2 wherein the isolation step comprises concentrating the culture liquid to one-fifth to one-twentieth of original volume, adding about three to ten volumes of a water-miscible organic solvent, separating precipitated impurities, contacting the residual solution with alumina having a pH between 5 to 8 thereby causing adsorption of L-6-diazo-5-oxonorleucine, eluting the adsorbed L-6-diazo-5-oxonorleucine with an eluant of the group consisting of water and aqueous solutions of water-miscible organic solvents, removing the eluant from the eluate containing L-6-diazo-5-oxonorleucine, forming a dilute solution of the L-6-diazo-5-oxonorleucine so obtained in water containing a minor proportion of a water-miscible organic solvent, adjusting the pH of the solution to pH 6 to 7, contacting the solution with activated carbon thereby causing adsorption of L-6-diazo-5-oxonorleucine, eluting the adsorbed L-6-diazo-5-oxonorleucine with water containing less than 25% of a water-miscible organic solvent and removing the eluant from the eluate containing L-6-diazo-5-oxonorleucine.

10. Process according to claim 9 wherein elution from alumina is accomplished with aqueous ethanol and from carbon with aqueous acetone.

References Cited in the file of this patent

UNITED STATES PATENTS

| | | |
|---|---|---|
| 2,483,871 | Bartz | Oct. 4, 1949 |
| 2,483,892 | Ehrlich et al. | Oct. 4, 1949 |